United States Patent [19]

Thompson

[11] Patent Number: 5,721,792
[45] Date of Patent: Feb. 24, 1998

[54] CONTROL OF BRIGHTNESS OF TEXT/ GRAPHICS OVERLAY

[75] Inventor: Edwin S. Thompson, Campbell Hall, N.Y.

[73] Assignee: Sensormatic Electronics Corporation, Boca Raton, Fla.

[21] Appl. No.: 705,022

[22] Filed: Aug. 29, 1996

[51] Int. Cl.$^6$ ................................................ G06K 9/40
[52] U.S. Cl. ............................................ 382/274; 358/461
[58] Field of Search ................................. 358/461–462, 358/464; 382/114, 266, 270–274; 348/28, 265, 586, 603, 673

[56] References Cited

U.S. PATENT DOCUMENTS

| | | | |
|---|---|---|---|
| 4,853,784 | 8/1989 | Abt et al. | 358/181 |
| 5,125,046 | 6/1992 | Siwoff | 382/54 |
| 5,267,331 | 11/1993 | Siwoff | 382/54 |
| 5,414,809 | 5/1995 | Hogan et al. | 395/155 |

*Primary Examiner*—Edward L. Coles, Sr.
*Assistant Examiner*—Stephen Brinich
*Attorney, Agent, or Firm*—Robin, Blecker, Daley and Driscoll

[57] ABSTRACT

In accordance with the principles of the present invention, the above and other objects are realized in an apparatus and method for superimposing text information on a video background signal. The apparatus includes means to input the video background signal, a text generator for generating a text signal containing the text information to be superimposed on the video background signal and automatic contrast circuit means for selectively controlling the brightness of the text signal to maintain at least a predetermined minimum contrast between the brightness of the text signal and the brightness of the video background signal as the brightness of the video background signal varies. The automatic contrast means maintains at least a predetermined minimum contrast by adding a predetermined amount of brightness to a first text signal generated by the text generator above the brightness of the video background signal to provide a second text signal for superimposing on the video background signal. The automatic contrast means may also include a comparison means to compare the brightness contrast between the first text signal and the video background signal and if the brightness of the first text signal is sufficiently greater than the brightness of the video background signal to provide a contrast greater than or equal to the predetermined minimum contrast, the brightness of the first text signal is not increased and is superimposed as the second text signal on the video background signal.

22 Claims, 2 Drawing Sheets

CONTROL OF BRIGHTNESS OF TEXT/ GRAPHICS OVERLAY

FIELD OF THE INVENTION

This invention relates to an apparatus and method for overlaying text and graphics on a video screen, and more particularly, to an apparatus and method for maintaining no less than a predetermined minimum brightness contrast between the text and graphics and the video background against which the text and graphics are displayed.

BACKGROUND OF THE INVENTION

Text and/or graphic information, hereinafter referred to as "text", sometimes becomes illegible or difficult to read when superimposed on a video background. This occurs when the contrast, between the superimposed information, and the video background, becomes diminished due to the excessive brightness of the video background. The text information often appears white, but when the camera is panned or tilted to a bright area, the white information becomes lost in the background and is no longer legible. This is a common problem in the CCTV (Closed Circuit Television) industry, where cameras are exposed to very dynamic lighting conditions, and legible time and date displays are required under all conditions. When video taping for legal evidence, the time, date and location display are also critical.

In some instances, particularly in studio environments, the scene can be composed by camera positioning to prevent the superimposed information from being degraded. If this is not possible, the background brightness can be reduced in the area surrounding the information by inserting a contrasting color, attenuated video, or black video levels. Text windows, shadowed and outlined text and graphics are also used to preserve contrast. These techniques are effective but may obscure too much of the video scene if there is much information to display. In the CCTV industry, commonly displayed information would include, for example, time/date, camera name or number, facility name and/or location, alarm status, monitor number, currently running switching sequences, and special camera modes.

In the CCTV industry, one way of dealing with the problem is to adjust the brightness setting on the text generators to maximum. A drawback is that the information can smear or "bloom" when the average picture level returns to normal and the information often appears out of focus. In addition, the long-term affects of displaying the overdriven text can lead to phosphor "burn-in" as seen in early video games. If, on the other hand, the brightness is adjusted to a lower setting, the scene brightness may, during panning and tilting or switching cameras, exceed the brightness setting and render the superimposed information illegible.

It is, therefore, an objective of the present invention to provide an improved apparatus and method for overlaying text information onto a background video such that the intensity of the text is adjusted to make it visible at all times no matter what the brightness of the background video may be.

SUMMARY OF THE INVENTION

In accordance with the principles of the present invention, the above and other objects are realized in an apparatus and method for superimposing text information on a video background signal. The apparatus includes means to input the video background signal, a text generator for generating a text signal containing the text information to be superimposed on the video background signal and automatic contrast circuit means for selectively controlling the brightness of the text signal to maintain at least a predetermined minimum contrast between the brightness of the text signal and the brightness of the video background signal as the brightness of the video background signal varies.

The automatic contrast means maintains at least a predetermined minimum contrast by adding a predetermined amount of brightness to a first text signal generated by the text generator above the brightness of the video background signal to provide a second text signal for superimposing on the video background signal.

The automatic contrast means may also include a comparison means to compare the brightness contrast between the first text signal and the video background signal and if the brightness of the first text signal is sufficiently greater than the brightness of the video background signal to provide a contrast greater than or equal to the predetermined minimum contrast, the brightness of the first text signal is not increased and is superimposed as the second text signal on the video background signal.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 1:
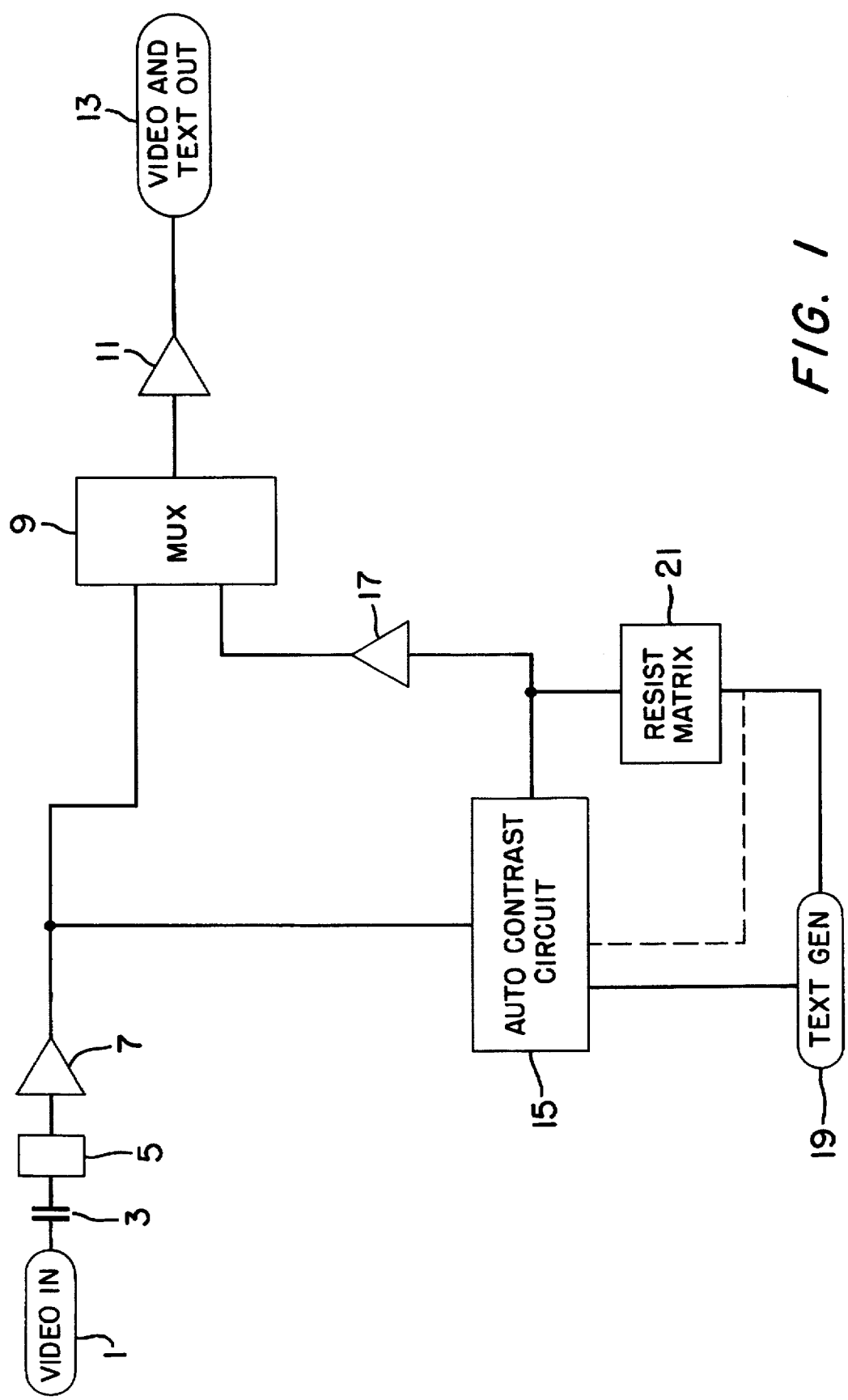
FIG. 1 illustrates a block diagram of the system of the present invention.

FIG. 1 shows a block diagram of an improved text overlay apparatus in accordance with the principles of the present invention. A video input 1 is connected to capacitor 3 which is connected to a DC restorer 5, and then to a unity gain amplifier 7. The output video signal of the unity gain amplifier 7 is input into multiplexer 9 and the output of multiplexer 9, which combines the video input with the text overlay, is connected to an amplifier 11. The output of amplifier 11 is combined video and text output 13 that is fed to a monitor screen.

An automatic contrast means which, in the preferred embodiment, may be circuit 15, also has as an input the video signal output from unity gain amplifier 7. The output of the automatic contrast circuit 15 is connected to the input of unity gain amplifier 17. The output of unity gain amplifier 17 is connected to the multiplexer 9.

A text generator 19 is provided with its output connected to a resistor matrix 21. The text generator 19 may also have a control output which is fed to the auto contrast circuit 15. Alternatively, this control output may also be fed from the input to resistor matrix 21. (Shown as a dotted line in FIG. 1.)

In operation, video input 1, containing the video background signal without text, applied to capacitor 3 where the DC component of the background video signal is stripped so that only AC video is passed through to DC restorer 5. DC restorer 5, comprising a voltage divider, a unity gain buffer and a diode, clamps the synchronizing tip and applies a new known DC reference. The video background signal with the new DC component is then buffered by unity gain amplifier 7 and is input to both the automatic contrast circuit 15 and the multiplexer 9.

Text generator 19 generates a first text signal which contains the text information to be added to the video background signal. The brightness of the first text signal, is determined by the text generator and resistor matrix 21 which sums the currents from the text generator 19. The input into amplifier 17 is a second text signal having a brightness selectively controlled by the automatic contrast circuit 15. If the output signal voltage of the automatic contrast circuit 15 is a brightness level which is greater than the brightness level of the first text signal output from resistor matrix 21, the second text signal brightness is increased to that of the brightness level of the output of the automatic contrast circuit 15. If the output of the automatic contrast circuit is less than the brightness level of the first text signal, output from resistor matrix 21, the automatic contrast circuit has no effect and the first text signal brightness level is fed through unchanged to amplifier 17 as the second text signal level. Multiplexer 9 combines the video background signal from amplifier 7 and the text information output from amplifier 17. The output of the multiplexer 9 is amplified by a gain of two by amplifier 11. The mixed video and second text signal is viewable on a video monitor (not shown) connected to the video and text output 13.

Thus, the brightness of the text information as represented by the second text signal and added to the video background signal is either the brightness of the first text signal if that signal is equal to or more than a predetermined minimum contrast from the video background signal, or a brightness that has been boosted by the level of brightness predetermined by the automatic contrast circuit 15 to maintain the desired minimum contrast over the video background signal. It should be noted that the second text signal may actually be the same as the first text signal when the first text signal is sufficiently bright so that boosting is unnecessary or if the automatic contrast circuit is disabled.

Figure 2:
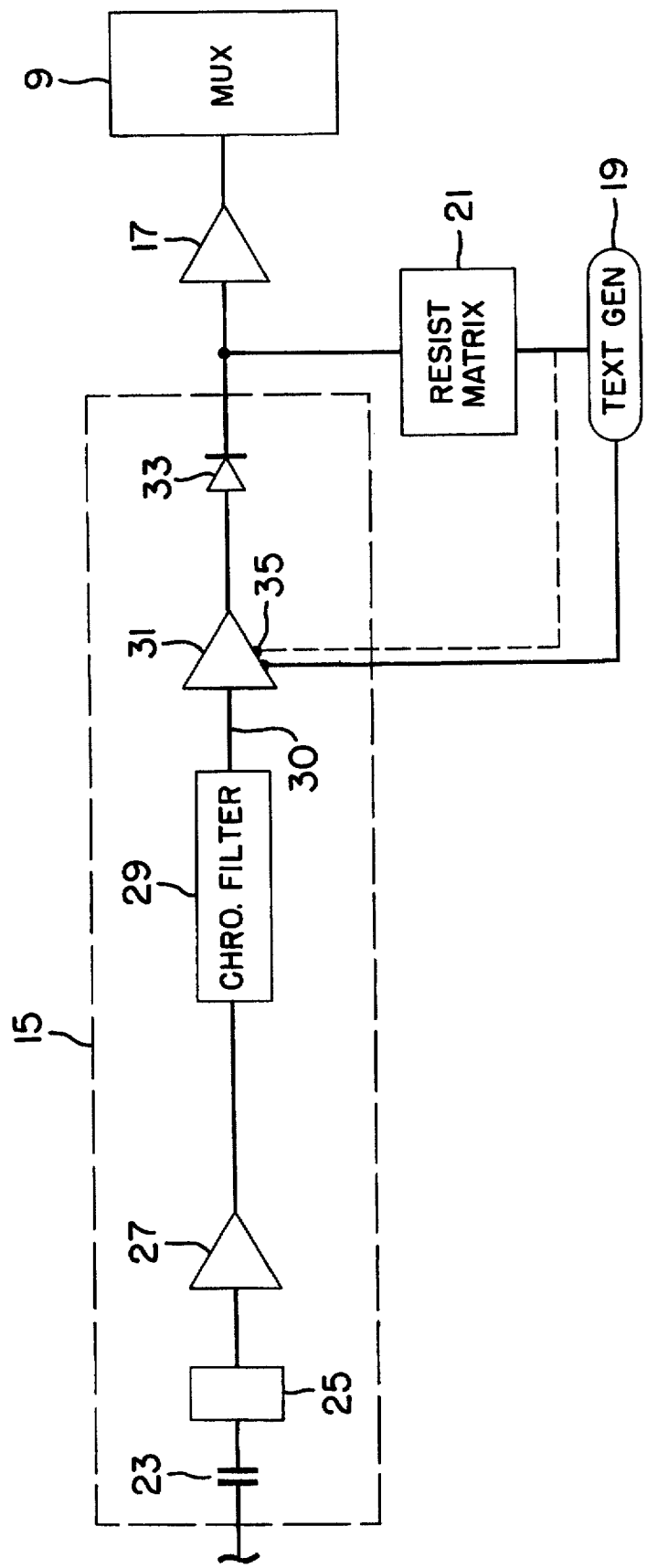
FIG. 2 illustrates a block diagram of components associated with an automatic contrast circuit.

Referring now to FIG. 2, there is illustrated a block diagram of the preferred embodiment of an automatic contrast circuit 15. The buffered video signal from amplifier 7 is fed into the automatic contrast circuit 15 through capacitor 23 to a DC restorer 25. An amplifier 27 is connected to the output of DC restorer 25, and the output of amplifier 27 is connected to a chrominance filter 29 and then to input 30 of an amplification means which, in the preferred embodiment, may be an amplifier 31. The output of amplifier 31, when selectively enabled as described hereinafter, is the amplified video background signal. A threshold means which may be a diode 33, is provided with its anode connected to the output of amplifier 31 and its cathode connected to the output of resistor matrix 21 and input of unity gain buffer 17. The input of the resistor matrix 21 is connected to the output of text generator 19. The amplifier 31 has a control input 35 which may be connected to the text generator 19. The output of the unity gain buffer 17 is connected to the input of multiplexer 9.

In operation, the capacitor 23 removes the DC component and a new lower DC level is set by the DC restorer 25. The new DC level is determined according to the predetermined gain of amplifier 27, such that the DC component of the output signal, after amplification and taking into consideration the forward voltage drop across diode 33, will approximate the DC level of the video background signal input into the contrast circuit 15 before amplification. The AC component of the video input signal will also be increased by the predetermined gain of amplifier 27. The lower DC component level at the output of DC restorer 25 is necessary because it is then amplified by amplifier 27. The gain or predetermined increase of amplifier 27 is set to maintain a desired predetermined minimum contrast between the brightness of the second text signal and the brightness of the background video signal. For example, the gain of amplifier 27 could be set to 1.30 to maintain at least a 30% contrast ratio.

The chrominance filter 29 filters out any unwanted chrominance signals that may be present. The output voltage from amplifier 31, which is the amplified video background signal, is applied to the anode of diode 33 which determines the minimum level of brightness threshold. The voltage corresponding to the brightness level of the first text signal, as it emerges from resistor matrix 21, is present on the cathode of diode 33. The diode 33 becomes forward biased when the voltage level or brightness at the output of amplifier 31 is more positive (brighter) than the (brightness) voltage level set in resistor matrix 21 and therefore, at this time, the level of the first text signal output from the resistor matrix 21 is boosted to the level of the output from amplifier 31 and becomes the second text signal. For example, if the video background signal is amplified by amplifier 27 to be 30% brighter than the video input into the multiplexer 9 and diode 33 is forward biased because the brightness level of the first text signal as set in resistor matrix 21 is less than that minimum desired brightness contrast over the video background signal, the level of the first text signal is boosted to the higher level to become the second text signal. On the other hand, if the level coming out of the resistor matrix 21 is greater than 30% brighter than the video input into the multiplexer 9, the diode 33 will not be forward biased, and the brightness of the text will be determined only by the text generator 19 and the resistor matrix 21 as the first text signal.

Thus, as the video background becomes brighter, the action of the automatic contrast circuit controls the brightness of the second text signal to maintain at least a predetermined minimum brightness contrast between the video background signal and the second text signal and the degree of brightness offset is determined by the gain setting of amplifier 27. Therefore, if the resistor matrix 21 tries to insert characters that are not as bright as the amplified video background signal, then the amplified video background signal is added to make the characters brighter. The second text signal is then input into multiplexer 9 where it is combined with the video background signal whereby the brightness of the second text signal is selectively maintained at least at a predetermined minimum contrast from the video background signal.

It is also desirable to provide a means to selectively disable the automatic contrast circuit to allow the first text signal, as generated by the text generator and the resistor matrix 21, to be passed through as the second text signal to amplifier 17 and multiplexer 9 without being subject to possible increase in brightness from the automatic contrast circuit. To accomplish this, the automatic contrast circuit is selectively disabled, depending on whether or not, for example, a particular character attribute is present. The amplifier 31 may be disabled from the text generator 19 by any character attribute, such as any color (dotted line) or a dedicated character attribute from the text generator 19. This allows the automatic contrast circuit to be controlled from the presence or absence of a selected character attribute in the text signal. For example, in the preferred embodiment, the presence in the text information of a voltage corresponding to the blue attribute may be connected to control input 35 which enables the amplifier 31 so that the automatic contrast circuit 15 is active. If there is no voltage corresponding to the blue attribute in the text information, there is no voltage on control input 35 to amplifier 31. Under this condition, the amplifier 31 is disabled. Therefore, the automatic contrast circuit 15 is not operative. In addition, the automatic contrast circuit 15 should not interfere with the ability to superimpose black text on the video background, if black text is desired. Since black text does not contain any voltage corresponding to the character attribute blue, amplifier 31 would be disabled and the automatic contrast circuit 15 would be inoperative so that the black characters or lines from the text could be displayed and not brightened by the automatic contrast circuit 15.

In all cases it is understood that the above-described arrangements are merely illustrative of the many possible specific embodiments which represent applications of the present invention. Numerous and varied other arrangements can readily be devised in accordance with the principles of the present invention without departing from the spirit and scope of the invention. For example, the automatic contrast circuit of the preferred embodiment assumes the use of a single power supply thereby requiring DC blocking and DC restoration circuits. However, if multiple power supplies or a negative voltage source is available, the DC blocking and subsequent DC restoration could be eliminated or further simplified. In addition, the automatic contrast means may use digital components with an adder and/or an accumulator and/or registers or any combination thereof. Another possible embodiment may include comparison means for comparing the text signal with the video background signal and adjusting the text signal accordingly, instead of a threshold means described in the preferred embodiment. Also, a digital signal processor may be used to generate the text information and to combine that information with the video background signal.

What is claimed:

1. An apparatus for superimposing a text signal on a video background signal having means to input the video background signal and a text generator for generating a text signal to be superimposed on the video background signal comprising:

automatic contrast means for controlling the brightness of the text signal to maintain at least a predetermined minimum contrast with the brightness of the video background signal as the brightness of the video background signal varies; and wherein said text generator generates a first text signal and said automatic contrast means maintains at least said predetermined minimum contrast by adding a predetermined amount of brightness to the first text signal above the brightness of the video background signal thereby providing a second text signal for superimposing on said video background signal.

2. The apparatus of claim 1 wherein said automatic contrast means comprises a comparison means to compare the contrast between the first text signal and the video background signal and if the brightness of the first text signal provides a contrast greater than or equal to the predetermined minimum contrast, the brightness of said first text signal is not increased and is superimposed on the video background signal as the second text signal.

3. The apparatus of claim 1 wherein said automatic contrast means includes amplification means to amplify the brightness of the video background signal to a predetermined increase over the brightness of the video background signal to establish an amplified video background signal as a minimum level of brightness for the second text signal.

4. The apparatus of claim 3 wherein said automatic contrast means includes a threshold means to establish a predetermined minimum brightness threshold below which the second text signal may not drop such that if the brightness of the first text signal is lower than that of the amplified video background signal, the brightness of the amplified video background signal is added to the brightness of the first text signal to provide the second text signal.

5. The apparatus of claim 3 wherein said automatic contrast means includes a capacitor for removing the DC component of the video background signal and a DC restorer to restore a new DC level which is set according to the predetermined increase of said amplification means such that the DC component at the output of the amplification means will approximate the DC level of the video background signal before amplification, and the AC component will be increased by the predetermined increase of the amplification means.

6. The apparatus of claim 4 wherein said threshold means comprises a diode which becomes forward biased when the voltage level at the output of the amplification means is greater than the voltage level of the first text signal.

7. The apparatus of claim 1 wherein said automatic contrast means includes a disable means to selectively disable said automatic contrast circuit means.

8. The apparatus of claim 7 wherein said disable means is responsive to the presence or absence of a character attribute from the text generator.

9. The apparatus of claim 7 wherein black text may be selectively superimposed on said video background signal.

10. The apparatus of claim 8 wherein said text generator controls the disable means from a selected character attribute generated by said text generator so that if said selected character attribute is not present, said automatic contrast circuit means will be disabled.

11. The apparatus of claim 10 wherein the character attribute is the color blue.

12. The apparatus of claim 10 wherein said text generator controls the disable means using a dedicated character attribute.

13. The apparatus of claim 1 further comprising a multiplexor to mix the video background signal and the text signal.

14. A method for superimposing a text signal on a video background signal comprising the steps of:

generating a text signal;

controlling the brightness of said text signal to maintain at least a predetermined minimum contrast between the brightness of the video background signal and the brightness of said text signal as the brightness of the video background signal varies;

combining the video background signal with the text signal whereby the brightness of the text signal is selectively maintained at least at a predetermined minimum contrast with the video background signal; and wherein said step of generating a text signal includes the generation of a first text signal and said step of controlling the brightness of the text signal includes the step of maintaining at least a predetermined minimum contrast by adding a predetermined amount of brightness to the first text signal above the brightness of the video background signal to provide a second text signal for superimposing on said video background signal.

15. The method of claim 14 wherein said step of controlling the brightness of the text signal includes the step of comparing the contrast between the first text signal and the video background signal and if the brightness of said first text signal is sufficient to provide a contrast greater than or equal to said predetermined minimum contrast, the brightness of the first text signal is not increased and is superimposed as the second text signal on the video background signal.

16. The method of claim 14 wherein said step of controlling the brightness of the text signal includes the step of amplifying the brightness of the video background signal to a predetermined increase to establish an amplified video background signal as a level for the minimum brightness of the second text signal.

17. The method of claim 16 wherein said step of controlling the brightness of the text signal includes the step of establishing a predetermined minimum brightness threshold below which the second text signal may not drop such that if the brightness of the first text signal is lower than the brightness of the amplified video background signal, the brightness of the amplified video background signal is added to the brightness of said first text signal to provide a second text signal at least as bright as the brightness of the amplified video background signal.

18. The method of claim 16 wherein said step of controlling the brightness of the text signal includes the step of removing the DC component of the video background signal and the step of setting a new DC level according to the predetermined increase of said amplifying step such that the DC component of the amplified video background signal will approximate the DC component of the video background signal before amplification, and the AC component of said video background signal is increased by the predetermined increase of the amplifying step.

19. The method of claim 17 wherein said step of establishing a predetermined minimum brightness threshold comprises forwarding biasing a diode when the voltage level at the output of the amplifying step is greater than the voltage level of the first text signal.

20. The method of claim 14 which includes the step of selectively disabling the step of controlling the brightness of the text signal.

21. The method of claim 20 wherein said step of selectively disabling is in response to the presence or absence of a character attribute in the text signal.

22. The method of claim 20 including the step of selectively superimposing black text on the video background signal.

* * * * *